(12) United States Patent
Zhang

(10) Patent No.: US 9,893,818 B2
(45) Date of Patent: Feb. 13, 2018

(54) HUMAN-BODY COMMUNICATION APPARATUSES AND METHODS OF EXCHANGING INFORMATION THEREOF

(71) Applicant: Huizhou TCL Mobile Communication Co., Ltd, Huizhou, Guangdong (CN)

(72) Inventor: Jie Zhang, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 0 days.

(21) Appl. No.: 15/317,247

(22) PCT Filed: Apr. 14, 2016

(86) PCT No.: PCT/CN2016/079250
§ 371 (c)(1),
(2) Date: Dec. 8, 2016

(87) PCT Pub. No.: WO2017/031992
PCT Pub. Date: Mar. 2, 2017

(65) Prior Publication Data
US 2017/0207860 A1    Jul. 20, 2017

(30) Foreign Application Priority Data
Aug. 24, 2015 (CN) .......................... 2015 1 0524611

(51) Int. Cl.
*H04B 13/00* (2006.01)
*H04W 4/00* (2009.01)
*H04B 5/00* (2006.01)

(52) U.S. Cl.
CPC ......... *H04B 13/005* (2013.01); *H04B 5/0031* (2013.01); *H04W 4/008* (2013.01)

(58) Field of Classification Search
CPC .... H04B 13/005; H04B 5/0031; H04W 4/008
See application file for complete search history.

(56) References Cited

U.S. PATENT DOCUMENTS 5,811,897 A * 9/1998 Spaude ............... B60R 25/2027
307/149
6,441,721 B1 * 8/2002 Tajima ................ G07C 9/00111
340/286.01
(Continued)

FOREIGN PATENT DOCUMENTS

CN    102333278 A    1/2012
CN    102333279 A    1/2012
(Continued)

OTHER PUBLICATIONS

International Search Report on corresponding PCT application (PCT/CN2016/079250) from International Searching Authority (CN) dated Jun. 29, 2016.

*Primary Examiner* — Lewis West
(74) *Attorney, Agent, or Firm* — Cheng-Ju Chiang

(57) ABSTRACT

Human-body communication apparatuses and methods of exchanging information thereof are disclosed. A human-body communication apparatus includes a processing module and a human-body communication module coupled to the processing module. When a user comes in contact with another user, the human-body communication module is configured to establish a wireless connection with the human-body communication apparatus of the other user. The processing module is configured to obtain a time duration of the wireless connection, compare the time duration with a preset first time threshold, and exchange information with the human-body communication apparatus of the other user via the human-body communication module, if the time duration is greater than the first time threshold. Thus, the present disclosure can allow interaction of information through body contact, increasing the user experience.

20 Claims, 1 Drawing Sheet

(56) References Cited

U.S. PATENT DOCUMENTS

| | | | | |
|---|---|---|---|---|
| 8,036,595 B2* | 10/2011 | Glass | ................... | H04W 40/24 |
| | | | | 340/5.52 |
| 8,606,177 B2* | 12/2013 | Hwang | ............... | H04B 13/005 |
| | | | | 340/852 |
| 9,288,836 B1* | 3/2016 | Clement | ............... | H04W 84/18 |
| 2006/0234631 A1 | 10/2006 | Dieguez | | |
| 2008/0287061 A1* | 11/2008 | Kim | .................... | H04B 13/005 |
| | | | | 455/41.1 |
| 2009/0181653 A1 | 7/2009 | Alharayeri | | |
| 2012/0026129 A1* | 2/2012 | Kawakami | ............ | G06F 1/1643 |
| | | | | 345/174 |
| 2013/0244575 A1* | 9/2013 | Forutanpour | ....... | H04M 1/7253 |
| | | | | 455/41.1 |
| 2015/0147968 A1* | 5/2015 | Friedman | ............ | H04W 76/023 |
| | | | | 455/41.2 |
| 2015/0201391 A1* | 7/2015 | Lee | ................... | H04W 52/0229 |
| | | | | 370/336 |
| 2015/0332031 A1* | 11/2015 | Mistry | .................. | G06F 21/316 |
| | | | | 726/19 |

FOREIGN PATENT DOCUMENTS

| | | |
|---|---|---|
| CN | 105228083 A | 1/2016 |
| FR | 2814313 A1 | 3/2002 |
| JP | 2006059239 A | 3/2006 |
| WO | WO2009089536 A1 | 7/2009 |

\* cited by examiner

HUMAN-BODY COMMUNICATION APPARATUSES AND METHODS OF EXCHANGING INFORMATION THEREOF

CROSS-REFERENCE TO RELATED APPLICATIONS

The present application is a 35 U.S.C. § 371 National Phase conversion of International (PCT) Patent Application No. PCT/CN2016/079250 filed Apr. 14, 2016, which claims foreign priority of Chinese Patent Application No. 201510524611.0, filed on Aug. 24, 2015 in the State Intellectual Property Office of China, the contents of all of which are hereby incorporated by reference.

TECHNICAL FIELD

The present disclosure generally relates to human-body communication technology, and in particular relates to human-body communication apparatuses and methods of exchanging information thereof.

BACKGROUND

Nowadays, in various business and social occasions, such as exhibitions, conferences, etc., massive amounts of personal information need to be exchanged to facilitate follow-up communication and cooperation. In the prior art business cards are used to exchange personal information. However, business cards are inconvenient to carry and only a limited number of them can be carried. Moreover, business cards are difficult to organize.

SUMMARY

In view of the above, embodiments of the present disclosure provide human-body communication apparatuses and methods of exchanging information thereof, which can enable the interaction of information through body contact, thus increasing the user experience.

There is provided a human-body communication apparatus that may be disposed on a user's body, the human-body communication apparatus comprising a processor, a memory, a human-body communication chip, an induction area, and a bus, wherein the processor, memory, and human-body communication chip are coupled to the bus respectively, the induction area is coupled to the human-body communication chip and may be disposed on the user's skin. The human-body communication chip may establish a wireless connection with the human-body communication apparatus of another user. The memory may be configured to store a program, and the processor may be configured to execute the program, the program being configured to:

obtain a time duration of the wireless connection;

compare the time duration with a preset first time threshold;

exchange information with the human-body communication apparatus of the other user, if the time duration is greater than the first time threshold; and disconnect the connection with the human-body communication apparatus of the other user, if the time duration is smaller than or equal to the first time threshold.

The program may be further configured to:

exchange information with the human-body communication apparatus of the other user, if the time duration is greater than the first time threshold and the connection with the human-body communication apparatus of the other user is disconnected.

The memory may further be configured to store the exchanged information. The exchanged information may comprise contact information.

The program may be further configured to:

determine whether it has already exchanged information with the human-body communication apparatus of the other user; and if so determined, update the contact information of the other user.

There is also provided a human-body communication apparatus that may be disposed on a user's body, the human-body communication apparatus comprising a processing module and a human-body communication module coupled to the processing module. When the user comes in contact with another user, the human-body communication module may be configured to establish a wireless connection with the human-body communication apparatus of the other user. The processing module may be configured to obtain a time duration of the wireless connection, compare the time duration with a preset first time threshold, and exchange information with the human-body communication apparatus of the other user via the human-body communication module, if the time duration is greater than the first time threshold.

If the time duration of the wireless connection is smaller than or equal to the first time threshold, then the human-body communication module may be configured to disconnect the connection with the human-body communication apparatus of the other user.

The human-body communication module may comprise a human-body communication chip and an induction area coupled to the human-body communication chip. The induction area may be disposed on the user's skin, and the human-body communication chip may establish the wireless connection with the human-body communication apparatus of the other user via the induction area.

The human-body communication apparatus may further comprise a wireless communication module coupled to the processing module. If the time duration is greater than the first time threshold and the human-body communication module is disconnected from the human-body communication apparatus of the other user, then the processing module may be configured to exchange information with the human-body communication apparatus of the other user via the wireless communication module.

The human-body communication apparatus may further comprise a storage module coupled to the processing module and configured to store the exchanged information, the exchanged information being contact information.

The processing module may be configured to acquire the contact information from the human-body communication apparatus of the other user, determine whether it has already exchanged information with the human-body communication apparatus of the other user, and, if so determined, update the contact information of the other user.

The human-body communication apparatus may further comprise a power supply module configured to power electric power to the human-body communication apparatus.

There is also provided a method of exchanging information using the human-body communication apparatus that may be disposed on a user's body, the method comprising:

establishing, by the human-body communication apparatus, a wireless connection with the human-body communication apparatus of another user when the user comes in contact with the other user;

obtaining, by the human-body communication apparatus, a time duration of the wireless connection, and comparing the time duration with a preset first time threshold; and exchanging, by the human-body communication apparatus, information with the human-body communication apparatus of the other user, if the time duration is greater than the first time threshold.

The method may further comprise:

disconnecting, by the human-body communication apparatus, the connection with the human-body communication apparatus of the other user if the time duration is smaller than or equal to the first time threshold.

Exchanging information with the human-body communication apparatus of the other user may comprise:

determining, by the human-body communication apparatus, whether it has already exchanged information with the human-body communication apparatus of the other user; and if so determined, updating, by the human-body communication apparatus, the contact information of the other user.

According to the above solutions provided by the disclosure, when a user comes in contact with another user, the human-body communication module may set up a wireless connection with the human-body communication apparatus of the other user. The processing module may acquire the time duration of the wireless connection and compare the time duration with a preset first time threshold. If the time duration is greater than the first time threshold, the processing module may exchange information with the human-body communication apparatus of the other user via the human-body communication module. So, the interaction of information can be triggered by a human coming in contact with another, thus increasing the user experience.

DETAILED DESCRIPTION

Human-body communication apparatuses disclosed herein are based on human-body communication technology, also referred to as human-body transmission, by which communication devices can transmit data using the human body as a signal propagation medium.

Figure 1:
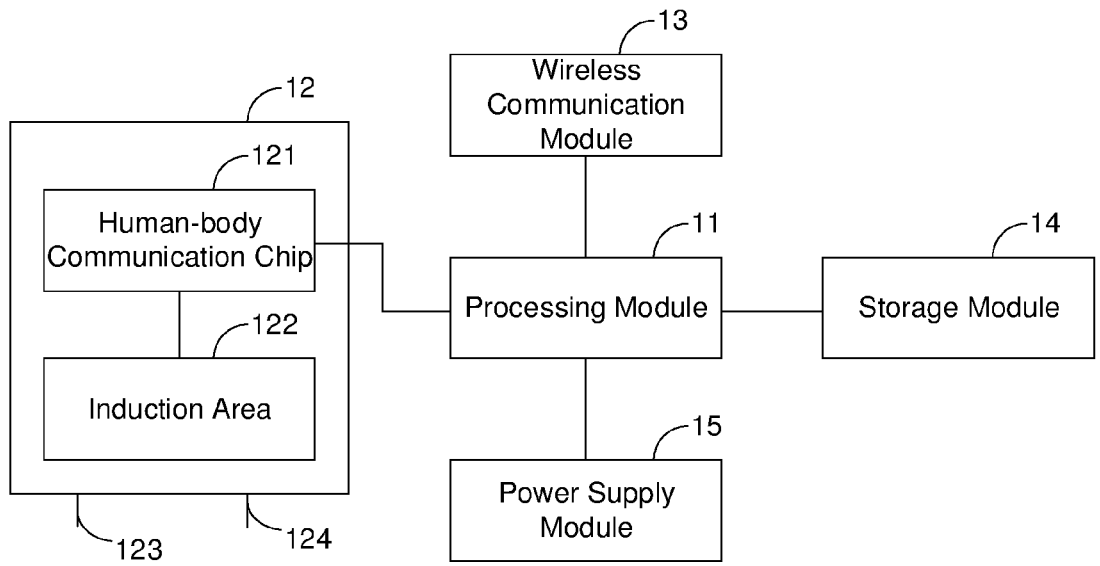
FIG. 1 is a block diagram illustrating a human-body communication apparatus according to a first embodiment of the disclosure.

Referring to FIG. 1, a block diagram of a human-body communication apparatus according to a first embodiment of the disclosure is depicted. The human-body communication apparatus 10 may be disposed on a user's body. For example, the human-body communication apparatus 10 typically may be wore around the user's wrist. In other embodiments, the human-body communication apparatus 10 may also be provided in the user's earrings, watches, or embedded in clothes.

The human-body communication apparatus 10 may comprise a processing module 11, a human-body communication module 12, a wireless communication module 13, a storage module 14, and a power supply module 15. The processing module 11 may be coupled to the human-body communication module 12, wireless communication module 13, storage module 14, and the power supply module 15, respectively.

When the user comes in contact with another user, such as handshaking, the human-body communication module 12 may begin to set up a wireless connection with the human-body communication apparatus of the other user. Specifically, after the human-body communication apparatus 10 is powered on, the human-body communication module 12 may work in a low-power mode, so that it would be able to detect the human-body communication apparatuses of other users in time and thus connect to these apparatuses. In other embodiments, the user may also contact with other users in other ways, such as hugging, et cetera.

The processing module 11 may be configured to obtain a time duration of the wireless connection. That is, the processing module 11 may start timing as the human-body communication module 12 builds up the wireless connection with the human-body communication apparatus of the other user, so as to obtain the duration the wireless connection is held. The processing module 11 may further be configured to compare the time duration of the wireless connection with a preset first time threshold, and exchange information with the human-body communication apparatus of the other user via the human-body communication module 12, if the time duration is greater than the first time threshold. Typically, the first time threshold may be set to 1 s. In other embodiments, those skilled in the art may also set the first time threshold as other values, such as 0.5 s.

If the time duration of the wireless connection is smaller than or equal to the first time threshold, then the human-body communication module 12 may be configured to disconnect the connection with the human-body communication apparatus of the other user. In particular, if the processing module 11 determines that the user's physical contact with another is a careless or inadvertent one, then the processing module 11 may be configured to control the human-body communication module 12 to disconnect the connection with the human-body communication apparatus of the other user, so as to avoid the exchange of information from being triggered by inadvertent contact.

The human-body communication module 12 may comprise a human-body communication chip 121 and an induction area 122 coupled to the human-body communication chip 121. The human-body communication chip 121 may be connected to the processing module 11. The induction area 122 may be disposed on a surface of the user that comes in contact with the human-body communication apparatus 10, i.e., a contact interface therebetween. For example, the induction area 122 may be surface-mounted on the user's skin. The human-body communication module 12 may further comprise a transmitter 123 and receiver 124, and thus supports duplex communication. When the user comes in contact with the other user, the transmitter 123 may transmit a connection request to the human-body communication apparatus of the other user, while the receiver 124 may simultaneously receive a connection request from the human-body communication apparatus of the other user. For example, the human-body communication chip 121 may be AS3900 from AMS (Austria Mikro Systeme), while the induction area 122 may be a metal sheet.

If the processing module 11 determines the time duration of the wireless connection is greater than the first time threshold and the human-body communication module 12 remains connected with the human-body communication apparatus of the other user, the processing module 11 may be configured to exchange information with the human-body communication apparatus of the other user via the human-body communication module 12. In particular, the human-body communication module 12 may be configured to send a wireless connection address of the human-body communication apparatus 10 to the human-body communication apparatus of the other user, and so transmit the user's interaction information to the human-body communication apparatus of the other user. Typically, the interaction information may be the user's contact information. The storage module 14 may be configured to store the user's contact information. The contact information may comprise title, phone number, and workplace.

If the processing module 11 determines the time duration of the wireless connection is greater than the first time threshold and the human-body communication module 12 is disconnected from the human-body communication apparatus of the other user, the human-body communication apparatus 10 may be configured to establish a wireless connection with the human-body communication apparatus of the other user via the wireless communication module 13. In particular, when the human-body communication module 12 sets up the connection with the human-body communication apparatus of the other user, the processing module 11 may be configured to transmit via the human-body communication module 12 the wireless connection address of the human-body communication apparatus 10 to the human-body communication apparatus of the other user. As such, the processing module 11 may exchange information with the human-body communication apparatus of the other user through the wireless communication module 13. Namely, the processing module 11 may be configured to transmit via the wireless communication module 13 the user's contact information to the human-body communication apparatus of the other user, and also acquire the other user's contact information via the wireless communication module 13.

When the human-body communication module 12 or the wireless communication module 13 receives the contact information of the other user, the processing module 11 may fetch the contact information and determine whether it has already exchanged information with the human-body communication apparatus of the other user. If so determined, the processing module 11 may update the other user's contact information that is stored in the storage module 14; if not so determined, the processing module 11 may store the contact information of the other user into the storage module 14.

Before the processing module 11 stores the contact information of the other user into the storage module 14, the processing module 11 may further determine whether the other user's contact information is valid. If the processing module 11 detects that within the timing period the human-body communication apparatus 10 remains connected with the human-body communication apparatus of the other user, then it may determine that the contact information of the other user is valid and may thus store it into the storage module 14. If the processing module 11 detects that within the timing period the human-body communication apparatus 10 is not connected to the human-body communication apparatus of the other user, then the processing module 11 may determine that the contact information of the other user is invalid and thus might not store it. The timing period may typically be chosen as the duration of the wireless connection between the human-body communication apparatus 10 and the human-body communication apparatus of the other user.

The power supply module 15 may be configured to provide electric power to the human-body communication apparatus 10. The wireless communication module 13 may comprise a low-power Bluetooth module, WiFi module, and so on.

According to the present embodiment, when a user comes in contact with another user, the human-body communication module 12 may set up a wireless connection with the human-body communication apparatus of the other user. The processing module may 11 acquire the time duration of the wireless connection and compare the time duration with a preset first time threshold. If the time duration is greater than the first time threshold, the processing module 11 may exchange information with the human-body communication apparatus of the other user via the human-body communication module 12. So, the interaction of information can be triggered by a human coming in contact with another, thus increasing the user experience.

Figure 2:
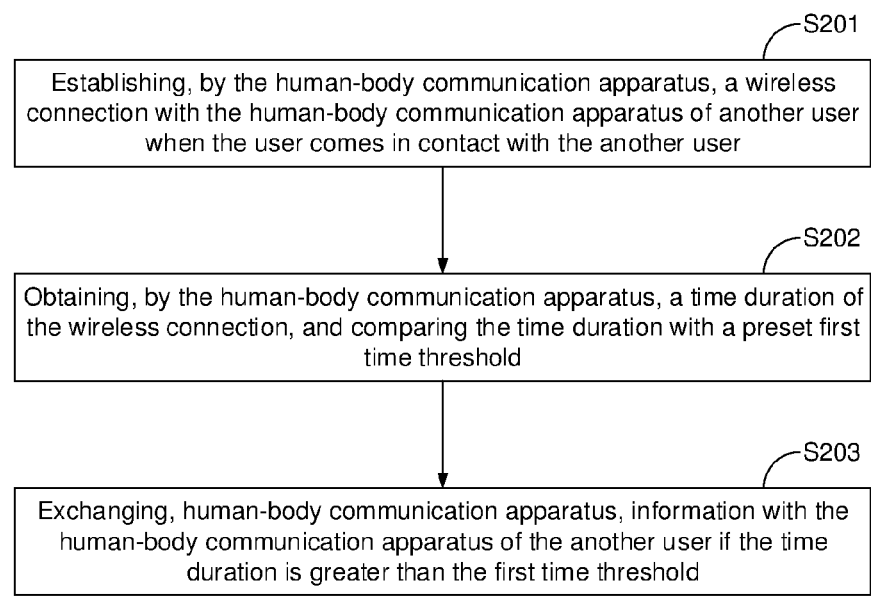
FIG. 2 is a flowchart illustrating a method of exchanging information using the human-body communication apparatus according to the first embodiment of the disclosure.

There is also provided a method of exchanging information using the human-body communication apparatus 10 according to the first embodiment of the disclosure. Referring now to FIG. 2, the method under discussion may comprise the following blocks.

In S201, when a user comes in contact with another user, the human-body communication apparatus 10 may build up a wireless connection with the human-body communication apparatus of the other user.

In S202, the human-body communication apparatus 10 may obtain a time duration of the wireless connection, and compare the time duration with a preset first time threshold.

In S203, if the time duration is greater than the first time threshold, the human-body communication apparatus 10 may exchange information with the human-body communication apparatus of the other user.

For example, in S201, when the user shakes hands with the other user, the human-body communication apparatus 10 may begin to establish the wireless connection with the human-body communication apparatus of the other user. Specifically, after the human-body communication apparatus 10 is powered on, it may work in a low-power mode so that it can timely detect the human-body communication apparatuses of other users and further connect to theses apparatuses. In other embodiments, the user may also contact with other users in other ways, such as hugging, et cetera.

For example, in S202, the human-body communication apparatus 10 may start timing as it sets up the wireless connection with the human-body communication apparatus of the other user, so as to obtain the time duration of the wireless connection.

For example, in S203, the human-body communication apparatus 10 may compare the time duration of the wireless connection with the preset first time threshold. If the time duration is larger than the first time threshold, then the human-body communication apparatus 10 may exchange information with the human-body communication apparatus of the other user. Typically, the first time threshold may be set to 1 s. In other embodiments, those skilled in the art may also set the first time threshold as other values, such as 0.5 s.

If the time duration is smaller than or equal to the first time threshold, then the human-body communication apparatus 10 may disconnect the connection with the human-body communication apparatus of the other user. In particular, if the human-body communication apparatus 10 determines that the user's physical contact with another is a careless or inadvertent one, then the human-body communication apparatus 10 may disconnect the connection with the human-body communication apparatus of the other user, so as to avoid the exchange of information from being triggered by inadvertent contact.

If the human-body communication apparatus 10 has already received the contact information of the other user, it may determine whether it has exchanged information with the human-body communication apparatus of the other user. If so determined, the human-body communication apparatus 10 may update the contact information of the other user; and if not so determined, the human-body communication apparatus 10 may store the other user's contact information.

Further, before the human-body communication apparatus 10 stores the other user's contact information, it may also determine whether the contact information of the other user is valid. If the human-body communication apparatus 10 detects that within the timing period it remains connected with the human-body communication apparatus of the other user, then it may determine that the contact information of the other user is valid and store it. If the human-body communication apparatus 10 detects that within the timing period it is not connected to the human-body communication apparatus of the other user, then the human-body communication apparatus 10 may determine that the contact information of the other user is invalid and thus might not store it. The timing period may be typically chosen as the duration of the wireless connection between the human-body communication apparatus 10 and the human-body communication apparatus of the other user.

There is also provided a human-body communication apparatus that may be disposed on a user's body, the human-body communication apparatus comprising a processor, a memory, a human-body communication chip, an induction area, a wireless communication chip, and a bus, wherein the processor, the memory, the wireless communication chip, and the human-body communication chip are respectively coupled to the bus, the induction area is coupled to the human-body communication chip and may be disposed on the user's skin. The human-body communication chip may establish a wireless connection with the human-body communication apparatus of another user. The memory may be configured to store a program, and the processor may be configured to execute the program, the program being configured to:

obtain a time duration of the wireless connection;

compare the time duration with a preset first time threshold;

exchange information with the human-body communication apparatus of the other user, if the time duration is greater than the first time threshold; and disconnect the connection with the human-body communication apparatus of the other user, if the time duration is smaller than or equal to the first time threshold.

The program may be further configured to:

exchange information with the human-body communication apparatus of the other user, if the time duration is greater than the first time threshold and the connection with the human-body communication apparatus of the other user is disconnected. More specifically, if the connection duration is greater than the first time threshold and the connection with the human-body communication chip of the other user's human-body communication apparatus has been disconnected, then the wireless communication chip can be used to exchange the information with the human-body communication apparatus of the other user.

The memory may be further configured to store the exchanged information. The exchanged information may comprise contact information.

The program may further be configured to:

determine whether it has already exchanged information with the human-body communication apparatus of the other user; and if so determined, update the contact information of the other user.

The memory may comprise a USB (Universal Serial Bus) flash disk, mobile hard drive, Read-only Memory (ROM), Random Access Memory (RAM), magnetic disk, optical disk, or any other medium that is able to store program codes. The processor may execute all or part of the methods illustrated in various embodiments of the disclosure.

According to the above description of the disclosure, when a user comes in contact with another, the human-body communication apparatus 10 may establish a wireless connection with the human-body communication apparatus of another user, obtain a time duration of the wireless connection, and compare the time duration with a preset first time threshold. If the time duration is greater than the first time threshold, the human-body communication apparatus 10 may exchange information with the human-body communication apparatus of the other user. So, the interaction of information can be triggered by a human coming in contact with another, thereby improving the user experience.

The above description depicts merely some exemplary embodiments of the disclosure, but is not meant to limit the scope of the disclosure. Any equivalent structures or flow transformations made to the disclosure, or any direct or indirect applications of the disclosure on other related fields, shall all be covered within the protection of the disclosure.

What is claimed is:

1. A human-body communication apparatus attached to a user, the apparatus comprising a processor, a memory, a human-body communication chip, an induction area, a wireless communication chip and a bus, wherein the processor, memory, human-body communication chip and wireless communication chip are coupled to the bus respectively, the induction area is coupled to the human-body communication chip and is disposed on a skin of the user, and the human-body communication chip is configured to establish a human-body communication connection with the human-body communication apparatus of another user via the induction area when the user comes in contact with the another user, wherein the memory is configured to store a program, and the processor is configured to execute the program, the program being configured to:

obtain a time duration of the human-body communication connection;

compare the time duration with a preset first time threshold;

exchange information with the human-body communication apparatus of the another user via the human-body communication connection when the time duration is greater than the first time threshold; and disconnect the human-body communication connection with the human-body communication apparatus of the another user when the time duration is less than or equal to the first time threshold;

the program is further configured to exchange information with the human-body communication apparatus of the another user via the wireless communication chip when the time duration is greater than the first time threshold and the human-body communication connection with the human-body communication chip of the human-body communication apparatus of the another user is disconnected, wherein wireless connection address of the human-body communication apparatus is transmitted to the human-body communication apparatus of the another user via the human-body communication chip when the human-body communication chip sets up the human-body communication connection with the human-body communication apparatus of the another user.

2. The human-body communication apparatus according to claim 1, wherein the memory is further configured to store the exchanged information, the exchanged information being contact information.

3. The human-body communication apparatus according to claim 2, the program is further configured to:
   detect the wireless connection between the human-body communication apparatus and the human-body communication apparatus of the another user within a timing period;
   when the wireless connection between the human-body communication apparatus and the human-body communication apparatus of the another user remains connecting within the timing period, determine the another user's contact information is valid; when the wireless connection between the human-body communication apparatus and the human-body communication apparatus of the another user is disconnected, determine the another user's contact information is invalid; wherein the timing period is duration of the wireless connection between the human-body communication apparatus and the human-body communication apparatus of the another user;
   the memory is configured to store the another user's contact information that is valid.

4. The human-body communication apparatus according to claim 2, wherein the program is further configured to:
   determine whether the human-body communication apparatus has already exchanged information with the human-body communication apparatus of the another user; and
   if so determined, update the contact information of the another user.

5. A human-body communication apparatus attached to a user, the apparatus comprising a processing module, a human-body communication module and a wireless communication module coupled to the processing module, wherein when the user comes in contact with another user, the human-body communication module is configured to establish a human-body communication connection with the human-body communication apparatus of the another user, and the processing module is configured to obtain a time duration of the human-body communication connection, compare the time duration with a preset first time threshold, exchange information with the human-body communication apparatus of the another user via the human-body communication module when the time duration is greater than the first time threshold and exchange information with the human-body communication apparatus of the another user via the wireless communication module when the time duration is greater than the first time threshold and the human-body communication connection with the human-body communication module of the human-body communication apparatus of the another user is disconnected, wherein wireless connection address of the human-body communication apparatus is transmitted to the human-body communication apparatus of the another user via the human-body communication module when the human-body communication module sets up the human-body communication connection with the human-body communication apparatus of the another user.

6. The human-body communication apparatus according to claim 5, wherein the human-body communication module is further configured to disconnect connection with the human-body communication apparatus of the another user when the time duration of the wireless connection is less than or equal to the first time threshold.

7. The human-body communication apparatus according to claim 6, wherein the human-body communication module comprises a human-body communication chip and an induction area coupled to the human-body communication chip and disposed on the skin of the user, the human-body communication chip being configured to establish the human-body communication connection with the human-body communication apparatus of the another user via the induction area.

8. The human-body communication apparatus according to claim 7, further comprising a wireless communication module coupled to the processing module, wherein the processing module is configured to exchange information with the human-body communication apparatus of the another user via the wireless communication module when the time duration is greater than the first time threshold and the human-body communication module is disconnected from the human-body communication apparatus of the another user.

9. The human-body communication apparatus according to claim 8, further comprising a storage module coupled to the processing module and configured to store the exchanged information, the exchanged information being contact information.

10. The human-body communication apparatus according to claim 9, wherein the processing module is configured to obtain the contact information from the human-body communication apparatus of the another user, determine whether the human-body communication apparatus has already exchanged information with the human-body communication apparatus of the another user, and, if so determined, update the contact information of the another user.

11. The human-body communication apparatus according to claim 10, further comprising a power supply module configured to provide electric power to the human-body communication apparatus.

12. A method of exchanging information using a human-body communication apparatus that is attached to a user, the method comprising:
   establishing, by the human-body communication apparatus, a human-body communication connection with the human-body communication apparatus of another user when the user comes in contact with the another user;
   obtaining, by the human-body communication apparatus, a time duration of the human-body communication connection, and comparing the time duration with a preset first time threshold; and
   exchanging, by the human-body communication apparatus, information with the human-body communication apparatus of the another user via the human-body communication connection when the time duration is greater than the first time threshold;
   transmitting, by the human-body communication apparatus, wireless connection address of the human-body communication apparatus to the human-body communication apparatus of the another user when the human-body communication module sets up the human-body communication connection with the human-body communication apparatus of the another user;

establishing, by the human-body communication apparatus, a wireless connection with the human-body communication apparatus of the another user; and exchanging, by the human-body communication apparatus, information with the human-body communication apparatus of the another user via the wireless connection when the human-body communication connection with the human-body communication module of the human-body communication apparatus of the another user is disconnected.

13. The method according to claim 12, further comprising:

disconnecting the human-body communication connection with the human-body communication apparatus of the another user when the time duration is smaller than or equal to the first time threshold.

14. The method according to claim 13, wherein exchanging information with the human-body communication apparatus of the another user comprises:

determining whether the human-body communication apparatus has already exchanged information with the human-body communication apparatus of the another user; and if so determined, updating, by the human-body communication apparatus, the exchanged information of the another user.

15. The human-body communication apparatus according to claim 1, wherein the contact between the user and the another user comprises hugging and handshaking.

16. The human-body communication apparatus according to claim 5, wherein the contact between the user and the another user comprises hugging and handshaking.

17. The human-body communication apparatus according to claim 5, wherein the human-body communication module is configured to work in a low-power mode and detect the human-body communication apparatus of the another user before establishing the wireless connection.

18. The human-body communication apparatus according to claim 5, wherein the human-body communication module comprises a transmitter and receiver configured for exchange of wireless connection requests and the information.

19. The human-body communication apparatus according to claim 8, wherein the wireless communication module comprises a low-power Bluetooth module and WiFi module.

20. The method according to claim 12, further comprising, before establishing the wireless connection with the human-body communication apparatus of the another user:

working, by the human-body communication apparatus, in a low-power mode and detecting the human-body communication apparatus of the another user.

* * * * *